F. E. CHAMBERLIN.
DISK SLED.
APPLICATION FILED MAR. 28, 1910.

969,600.

Patented Sept. 6, 1910.

Witnesses
L. B. James
Francis Boyle

Inventor
Floyd E. Chamberlin
By Chandler & Chandler
Attorneys

UNITED STATES PATENT OFFICE.

FLOYD E. CHAMBERLIN, OF SCHALLER, IOWA.

DISK-SLED.

969,600.  Specification of Letters Patent.  Patented Sept. 6, 1910.

Application filed March 28, 1910. Serial No. 551,866.

*To all whom it may concern:*

Be it known that I, FLOYD E. CHAMBERLIN, a citizen of the United States, residing at Schaller, in the county of Sac, State of Iowa, have invented certain new and useful Improvements in Disk-Sleds; and I do hereby declare the following to be a full, clear, and exact description of the invention, such as will enable others skilled in the art to which it appertains to make and use the same.

This invention relates to sleds used in carrying disk plows to and from the field and has for its principal object to provide a sled which may be hooked to the plow draft pole so that the draft animals need not be removed from the plow.

The novelty of this invention resides in the construction and arrangement of the cleats which hold the disk plow in position on the sled.

In the accompanying drawing forming part of this specification, Figure 1 is a side elevation of a disk carrying sled constructed in accordance with my invention and showing a disk plow thereon. Fig. 2 is a plan view of the sled. Fig. 3 is a longitudinal sectional view of the sled.

Referring now to the drawings, in which like characters of reference designate similar parts in the views shown, 10 and 11 designate a pair of substantially rectangular timbers which constitute the runners of the sled. These timbers may be shod with metal if desired to protect their wear surfaces. The forward bottom corner of each runner is cut away as shown at 12 to provide an inclined surface to guide the runners over obstructions, and the rear upper corner of each runner is cut away as shown at 13 to provide an inclined seat for the rear cleat. Arranged transversely upon the top faces of the runners are a pair of cleats 14 and 15 which will be hereinafter referred to as the rear and forward cleats respectively. Each cleat is preferably formed from a rectangular timber and has its top face rounded as shown at 16. Countersinks 17 are formed in the top faces 16 of the cleats to house the heads of bolts 18 which pass through the cleats and runners and are provided with nuts 19 which bear against the top faces of countersinks 20 formed in the bottom faces of the runners. The rear cleat 14 is arranged on the inclined portions 13 of the runners with its rounded top face disposed rearwardly as shown to provide a sloping surface over which the disks may pass in advancing into engagement with the top faces of the runners beyond the forward face of the cleat. The forward cleat 15 is spaced from the rear cleat a distance approximately equal to the diameters of the disks and is arranged with its curved top face sloping toward the forward ends of the runners so as to provide an inclined surface over which the disks may advance when leaving the sled. It is now clear that the draft animals may be driven over the sled until the disks have dropped into the space between the cleats in which position the sled may be hooked to the draft pole as will presently be described and the plow transported to its destination without unhitching the draft animals. When it is desired to remove the plow from the sled, the latter is unhooked from the draft pole, and the disks elevated so as to clear the rear face of the forward cleat when the animals are driven forward, thus advancing the plow off from the sled.

A brace plank 21 is bolted transversely of the top faces of the runners in advance of the forward cleat. The securing bolts 22 which secure the plank to the runners have their heads countersunk in the plank as shown at 23 and their retaining nuts countersunk in the bottom faces of the runners as shown at 24.

For hooking the sled to the plow draft pole the following construction is employed: secured to the forward end of each runner is a clevis 25 formed in the usual manner from a single strap of metal bent U shaped and having its terminals provided with eyes which receive a bolt 26 passed transversely through the side faces of the runner. Projecting forwardly from the clevises are links 27 and 28 each having at one extremity an eye 29 loosely engaging the clevis and at its opposite extremity a bill 30 bent at right angles or substantially so to the body of the link. An eye bolt 31 is secured to the draft tongue with its eye depending from the bottom face of the tongue as shown. This eye bolt is so positioned on the tongue that the bills of the hooks 27 will register with the eye when the disks are engaged between the cleats 14 and 15. It is now clear that when the draft animals are halted after the disks have dropped between the cleats, the hooks may be easily engaged in the eye bolt, after which the animals may be started and the sled and plow transported to the field as will be readily understood.

It will be seen that since the bolt heads and retaining nuts are countersunk in the runners and cleats that there will be no obstruction offered to the sled moving easily over the ground nor to the disks advancing upon or off from the cleats. It will be further noted that by virtue of the rear cleat being seated on inclined surfaces, that there will be less tendency for the sled to slip forwardly when the disks engage the rearmost part of the cleat than were the cleat arranged upon horizontal surfaces.

From the foregoing description taken in connection with the accompanying drawing, it is thought that the construction and operation of my invention will be easily understood, it being understood that various changes in the form, proportion and minor details of construction may be made within the scope of the appended claim.

What is claimed is:—

A sled comprising runners having their rear upper corners cut away to provide inclined seats, a cleat secured transversely upon said seats and having its top face sloping rearwardly, a cleat secured transversely on the runners in advance of the first-named cleat and having its top face sloping forwardly, and hooks pivotally connected to the forward ends of the runners and having their bills engageable with a draft pole.

In testimony whereof, I affix my signature, in presence of two witnesses.

FLOYD E. CHAMBERLIN.

Witnesses:
E. W. SCHAEFER,
RALPH A. CHAMBERLIN.